March 27, 1973 K. UTZ ET AL 3,723,168
METHOD OF PRODUCING LAMINATED PLASTIC FOIL TUBING
Filed Jan. 27, 1971
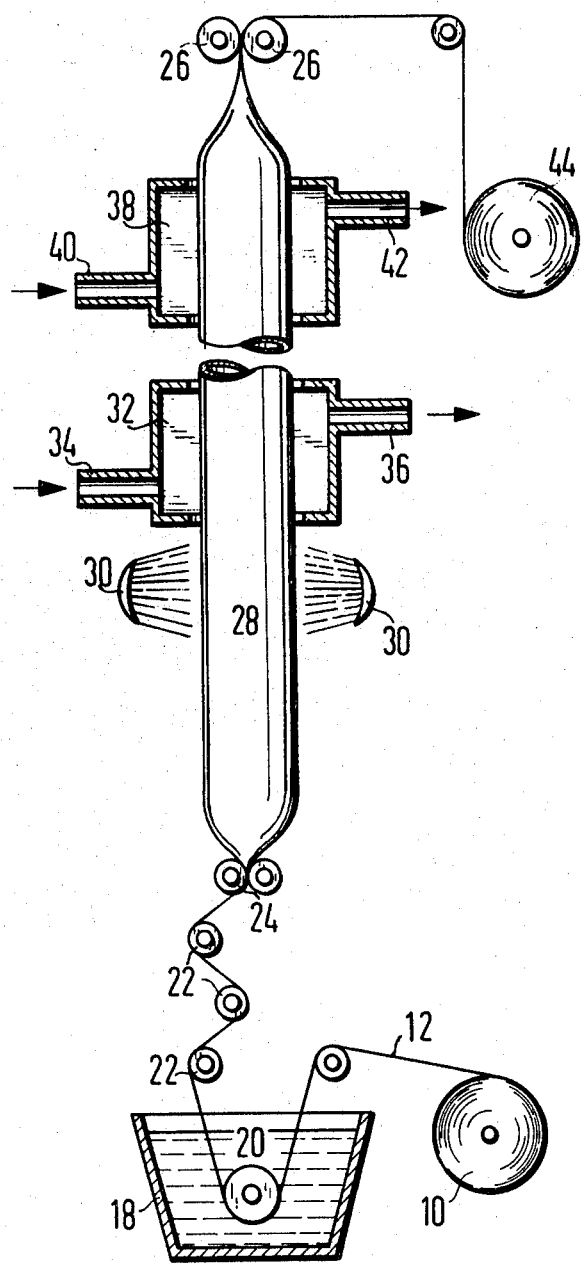
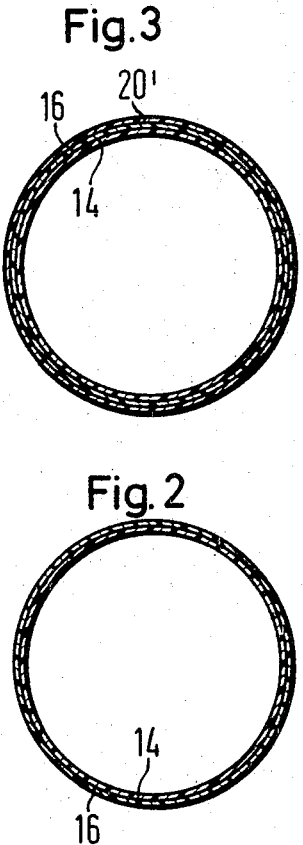
Fig. 3
Fig. 2
Fig. 1
INVENTORS.
Kastulus Utz
Heinrich Antholzner
BY: Kelman and Berman
AGENTS

# United States Patent Office 3,723,168
Patented Mar. 27, 1973

3,723,168
METHOD OF PRODUCING LAMINATED PLASTIC FOIL TUBING
Kastulus Utz, Freising, and Heinrich Antholzner, Socking, Germany, assignors to Multifoil Patentverwertungs AG, Chur, Switzerland
Filed Jan. 27, 1971, Ser. No. 110,072
Int. Cl. B44d 1/02
U.S. Cl. 117—94                                                9 Claims

ABSTRACT OF THE DISCLOSURE

A laminated plastic foil tube having an inner polyethylene layer and an outer nylon layer is passed through an aqueous suspension of vinylidene chloride homopolymer or copolymer while in the flattened condition, thereafter inflated, and the aqueous coating is dried at a temperature high enough to make the polyethylene tacky. The deposited polyvinylidene is sintered at an even higher temperature to make it homogeneous and free from pores, and the coated tube is cooled, deflated, and stored in the flattened condition. The triple plastic layer is impervious to water vapor and other vapors, grease, and oxygen, and suitable as a wrapper for food and the like.

---

This invention relates to a method of producing a tubular body having at least three superimposed foil layers of synthetic resin composition.

In earlier patents (see No. 3,184,358), one of us has disclosed methods and apparatus for bonding two layers of plastic foil into a laminated tube whose layers consist of dissimilar synthetic resin compositions, and which combines desirable properties of both components, making the product useful as a wrapping material for food and the like. An even more versatile and valuable wrapping material is obtained when three layers of dissimilar synthetic resin compositions are superimposed, but the methods of the earlier patents are not readily adapted for making a three-layer foil tube at low cost.

A third layer may be applied to the binary laminate by coating the same with a dispersion, that is, a solution or a suspension of the third resin composition. Because of its low cost and generally desirable properties, low-melting polyethylene is a desirable component of the initial two layers, but tends to soften and to become tacky at the boiling temperatures of the liquid in the dispersion of the third composition. The coating, therefore, must be dried at relatively low temperatures at which the liquid volatilizes rather slowly, and it has not been practical heretofore to make a ternary laminate by coating a binary laminary tube with a solution or suspension of a third resin composition in a cheap liquid, and by thereafter volatilizing the liquid.

The primary object of the instant application is the provision of a method which permits a tubular body having three superimposed foil layers of synthetic resin composition to be produced by coating a binary tubular laminate with a dispersion of a third composition in a volatile liquid, and by volatilizing the liquid at a rate high enough to make the method useful for industrial application.

With this object and others in view, as will hereinafter become apparent, the method of the invention uses as starting material a laminated plastic foil tube having two superimposed layers of synthetic resin composition, the inner layer essentially consisting of a first synthetic resin composition having a low softening point. The outer layer essentially consists of a second synthetic resin composition whose softening point is higher than that of the inner layer.

The outer face of this starting material is coated with a dispersion of the third synthetic resin composition, the term "dispersion" being used herein in its broadest sense to include molecular dispersions or solutions, not only colloidal dispersions and suspensions. Since the foil layers are too thin to be shaped retaining, the starting tube is flat or collapsed while being coated, and is thereafter inflated. The inflated tube may now safely be heated to a temperature at which the first resin composition becomes tacky or actually to the softening range of the first composition as long as the softening point of the second composition is not exceeded, and the volatile liquid driven off quickly at the relatively high temperature. The tube is deflated only after it has been cooled sufficiently to make the inner layer non-tacky.

Other features, additional objects, and many of the attendant advantages of this invention will readily become apparent from the following detailed description of a preferred embodiment when considered in connection with the appended drawing, in which:

FIG. 1 shows apparatus performing the method of the invention in fragmentary elevation;
FIG. 2 illustrates the starting material in the expanded or inflated condition in transverse section; and
FIG. 3 shows the final product in the manner of FIG. 2.

Referring now to the drawing in detail, and initially to FIG. 1, there is shown only as much of the apparatus employed for carrying out the method of the invention as is needed for an understanding of the latter, the non-illustrated portions being conventional in themselves.

A rotatably mounted supply reel 10 is being unwound to furnish a flat band 12 of laminated foil tubing shown in FIG. 2 in the expanded or inflated condition. It has an inner layer 14 of low-melting polyethylene bonded to an outer nylon layer 16 whose softening temperature is much higher.

The flat, collapsed, tubular body 12 passes over a guide roller in a tank 18 filled with an aqueous suspension 20 of a copolymer of 85% vinylidene chloride and 15% vinyl chloride (Saran). It is then led back and forth between rollers 22 which control the thickness of the aqueous layer picked up from the suspension 20 and distribute it over the full width of the tube 12.

The tube 12 thereafter passes between a first pair of driven pinch rollers 24 and ultimately between a second pair of driven pinch rollers 26 before being wound on a receiving reel 44. During threading of the tube 12 through the pinch rollers 24, 26, an air bubble 28 is trapped in the tube and remains trapped between the rollers 24, 26 while the tube travels continuously from the supply reel 10 to the receiving reel 44 on which it is again stored in the collapsed condition.

The inflated or expanded portion of the tube 12 between the pairs of pinch rollers 24, 26 passes first between infrared radiant heaters 30 whose energy is preferentially absorbed in the aqueous phase of the outer coating, whereby the water is heated and largely evaporated. The remaining liquid, if any, is volatilized in an oven 32 which is supplied with hot air through an inlet 34, the air being released through a discharge port 36. The heated, coated tube then passes through a cooling chamber 38 similar to the oven 32 and supplied with cooling air through an inlet 40 while the spent air is discharged through a port 42.

As it leaves the cooling chamber 38, the inflated tube has the structure shown in FIG. 3, the inner polyethylene layer 14 being covered in sequence by the nylon layer 16 and an outermost polyvinylidene copolymer layer 20'. After passing through the second pair of pinch rollers 26 which prevent the escape of air from the bubble 28, the tube now having three bonded layers of solid synthetic resin composition and approximately equal thickness is again flattened or collapsed prior to being wound on the reel 44.

The mechanical strength of the tube 12 is maintained by the nylon layer 16 while the tube travels past the infrared heaters 30 and through the oven 32. The temperatures during heat treatment may therefore be chosen quite freely within the limits set by the softening temperature of the nylon.

Under typical operating conditions, the apparatus of FIG. 1 was used with a starting material having an inner polyethylene layer of sp. gr. 0.922 and a melting index of 0.7 (determined under a load of 2 kg. at 190° C.) and an outer layer of polycaprolactam (nylon 6). The aqueous dispersion in the tank 18 contained 47% solids, the balance being essentially water and a small amount of a commercial surfactant for keeping the resin in suspension. The resin suspension was applied at a rate of 5 g./m.$^2$, based on dry resin content. The temperature reached under the infrared heaters was 150° C., and the brief dwell time within range of the radiant heaters was sufficient to volatilize practically all the water, the remainder being driven off in the oven 32 which was supplied with hot air at 160° C. This temperature was not only sufficient to remove any residual water, but also high enough to cause sintering of the resin deposited from the aqueous suspension and to homogenize the coating so that it emerged from the oven 32 substantially free from pores.

During passage of the tube under the heaters 30 and through the oven 32, the softening point of the inner polyethylene layer was exceeded, but this did not affect the success of the coating and drying operation. While the polyethylene layer 14 was extremely tacky at this stage, there was no contact between exposed polyethyene faces. Such contact was established again only after the ternary laminate had been cooled well below the softening temperature of the polyethylene in the cooling chamber 38.

Polyethylene may be bonded in a known manner not only to polycaprolactam (nylon 6), but also to other polyamides, such as nylon 6/6, nylon 6/10, nylon 6/11, and the coating procedure outlined above has been applied virtually unchanged to starting materials having outer layers of such other nylons. Generally, best results are achieved with nylon types whose specific gravity is between 1.11 and 1.16, and whose melting points are between 205° and 225° C.

The pressure in the air bubble 28 is not readily measured, and need not be measured. The amount of initially cold air to be trapped is best determined experimentally for each type of laminar foil product that is to be treated, and it is not particularly important that any specific degree of inflation be reached since a tubular product inherently spreads in such a manner that face-to-face contact between respective inner wall portions is avoided even with a minimum of inflation.

The procedure is applicable to and useful for any kind of laminar tubing whose layers may be termed "foils," that is, sheet material thin enough to be pliable and not capable of retaining its shape under the influence of gravity.

The method of this invention has its greatest economic value at this time in the processing of tubing based on low-density polyethylene which would stick to itself at practical drying temperatures, but it is not limited to the specific resin composition of the innermost layer in the illustrative example given above.

The ternary laminates of the invention, in which a vinylidene homopolymer or copolymer and polyethylene are bonded to opposite faces of a nylon foil, are impervious to water, water vapor, oxygen, odors, and fat or oil. They are eminently suitable for packaging food. No adhesives are employed between the several layers. If the emulsifier or suspending agent employed in preparing the polyvinylidene suspension is not free from odor, the odor is barred from affecting the packaged goods by the nylon layer.

Water, of course, is the least expensive liquid phase for use in the coating suspension, but other liquids may be employed as solvents or dispersants. Aqueous suspensions in which the resin composition amounts to 35 to 65 percent of the combined weight of water and resin, and preferably to 45 to 55 percent, have been used successfully with polyvinylidene and with copolymers of vinylidene with other monomers, more specifically polyvinyl chloride.

It is simple and effective to coat a starting tube with such relatively concentrated suspensions by dipping as shown in FIG. 1, but other application methods may be resorted to, and spray coating is specifically contemplated. An excess of coating material is wiped from the tubular body by the rollers 22, and the remainder is evenly distributed over the width of the flattened tube. The thickness of the ultimately produced third layer is controlled by adjusting the composition of the coating solution, and by suitably choosing the number of rollers 22, the angle of wrap, and the contact tension at the rollers.

The vinylidene chloride-vinyl chloride copolymer specifically referred to above melts at approximately 170° C., and it softens at 120° to 140° C. so that the deposit left on the initial binary laminate is homogenized and rendered pore-free by sintering without melting in the oven 32.

While the invention has been described with particular reference to specific embodiments, it is to be understood that it is not limited thereto, but is to be construed broadly and restricted solely by the scope of the appended claims.

What is claimed is:

1. A method of producing a tubular body having three superimposed foil layers of synthetic resin composition which comprises:
    (a) coating the outer face of a laminated plastic foil tube having two superimposed layers of synthetic resin composition with a dispersion of a third synthetic resin composition in a volatile liquid,
        (1) one of said two layers essentially consisting of polyethylene, and
        (2) the other layer essentially consisting of nylon having a higher softening point than said polyethylene;
    (b) inflating the coated tube;
    (c) heating the inflated tube to a temperature at which said polyethylene becomes tacky for a time sufficient to volatilize said liquid and thereby to form an outermost layer of said third composition on said tube;
    (d) thereafter cooling the tube below said temperature; and
    (e) deflating the cooled tubular body so produced.

2. A method as set forth in claim 1, wherein said temperature is above the softening point of said polyethylene and below said higher softening point.

3. A method as set forth in claim 2, wherein said one layer is the inner one of said two layers.

4. A method as set forth in claim 1, wherein the resin of said third composition essentially consists of polyvinylidene chloride or a copolymer of vinylidene chloride and vinyl chloride, the layers of said tubular body being too thin to make said body shape-retaining when cooled.

5. A method as set forth in claim 4, wherein said liquid is water, the resin of said third composition being suspended in said water.

6. A method as set forth in claim 5, wherein the weight of said third composition is between 35 percent and 65 percent of the combined weight of said third composition and of said water.

7. A method as set forth in claim 1, wherein the outer face of said tube is coated with said dispersion by passing said tube through a body of said dispersion.

8. A method of producing a tubular body having three superimposed foil layers of synthetic resin composition which comprises:
    (a) coating the outer face of a laminated plastic foil tube having two superimposed layers of synthetic resin composition with a dispersion of a third synthetic resin composition in a volatile liquid,
   (1) one of said two layers essentially consisting of a first synthetic resin composition having a low softening point, and
   (2) the other layer essentially consisting of a second synthetic resin composition having a softening point higher than said low softening point;
(b) inflating the coated tube;
(c) heating the inflated tube to a temperature at which said first composition becomes tacky for a time sufficient to volatilize said liquid and thereby to form an outermost layer of said third composition on said tube, said temperature being above the softening point of said third composition and sufficient to sinter said outermost layer;
(d) thereafter cooling the tube below said temperature; and
(e) deflating the cooled tubular body so produced.

9. A method of producing a tubular body having three superimposed foil layers of synthetic resin composition which comprises:
(a) coating the outer face of a laminated plastic foil tube having two superimposed layers of synthetic resin composition with a dispersion of a third synthetic resin composition in a volatile liquid,
   (1) the inner one of said two layers essentially consisting of a first synthetic resin composition having a low softening point,
   (2) the other layer essentially consisting of a second synthetic resin composition having a softening point higher than said low softening point,
   (3) the resin in said second synthetic resin composition being nylon 6, nylon 6/6, nylon 6/10, or nylon 6/11, having a specific gravity of 1.11 to 1.16, and a melting point of 205° to 225° C.;
(b) inflating the coated tube;
(c) heating the inflated tube to a temperature at which said first composition becomes tacky for a time sufficient to volatilize said liquid and thereby to form an outermost layer of said third composition on said tube;
(d) thereafter cooling the tube below said temperature; and
(e) deflating the cooled tubular body so produced.

References Cited

Polymers and Resins by Brace Golding, copyright 1959 by D. Van Nostrand Co. Inc., pp. 378–379 relied upon.

EDWARD G. WHITBY, Primary Examiner

U.S. Cl. X.R.

117—115, 138.8 E, 138.8 N, 161 R